(12) United States Patent
Onaizi (10) Patent No.: US 12,024,670 B2
(45) Date of Patent: *Jul. 2, 2024

(54) PERMANGANATE BASED HYDROGEN SULFIDE SCAVENGING DRILLING FLUID

(71) Applicant: KING FAHD UNIVERSITY OF PETROLEUM AND MINERALS, Dhahran (SA)

(72) Inventor: Sagheer A. Onaizi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/938,778

(22) Filed: Oct. 7, 2022

(65) Prior Publication Data

US 2023/0383165 A1 Nov. 30, 2023

Related U.S. Application Data

(62) Division of application No. 17/751,785, filed on May 24, 2022, now Pat. No. 11,479,706.

(51) Int. Cl.
C09K 8/16 (2006.01)
C09K 8/14 (2006.01)
C09K 8/24 (2006.01)

(52) U.S. Cl.
CPC .............. *C09K 8/24* (2013.01); *C09K 8/145* (2013.01); *C09K 8/16* (2013.01)

(58) Field of Classification Search
CPC . C09K 8/24; C09K 8/145; C09K 8/16; C09K 2208/10; C09K 2208/12; C09K 2208/20; C09K 8/52; C09K 8/36
See application file for complete search history.

(56) References Cited

U.S. PATENT DOCUMENTS

| 3,301,323 | A | 1/1967 | Parsons | |
|---|---|---|---|---|
| 10,662,365 | B2 | 5/2020 | Dino et al. | |
| 11,499,085 | B1 * | 11/2022 | Sangaru | E21B 21/003 |
| 2009/0008095 | A1 * | 1/2009 | Duncum | C09K 8/502 |
| | | | | 166/276 |
| 2018/0179433 | A1 * | 6/2018 | Hernández | C09K 8/36 |
| 2018/0298266 | A1 * | 10/2018 | Marr | C09K 8/00 |

FOREIGN PATENT DOCUMENTS

| CN | 104726083 B | 9/2018 |
|---|---|---|
| CN | 111440601 A | 7/2020 |
| CN | 110331951 B | 7/2021 |
| CN | 112574368 B | 7/2021 |

OTHER PUBLICATIONS

Murtaza (M. Murtaza et al, Optimum selection of H2S scavenger in light-weight and heavy-weight water-based drilling fluids, ACS Omega, 2021, 6, 24919-24930).*

Murtaza, et al. ; Optimum Selection of H2S Scavenger in Light-Weight and Heavy-Weight Water-Based Drilling Fluids ; ACS Omega, 6 ; Sep. 15, 2021 ; 12 Pages.

Al-Yami, et al. ; Emulsifiers Used in Designing Emulsion Based Drilling Fluids ; Research & Reviews: Journal of Chemistry, vol. 7, Issue 4 ; Nov. 11, 2018 ;12 Pages.

Qin, et al. ; Research on High Temperature and High Density White Oil Based Drilling Fluid and Its Application in Well 201H7-6 ; Open Journal of Yangtze Gas and Oil, 4 ; pp. 174-182 ; Jul. 24, 2019 ; 9 Pages.

* cited by examiner

*Primary Examiner* — Kumar R Bhushan (74) *Attorney, Agent, or Firm* — Oblon, McClelland, Maier & Neustadt, L.L.P.

(57) ABSTRACT

A method of drilling a subterranean geological formation is described. The method includes driving a drill bit to form a wellbore into the subterranean geological formation thereby producing a formation fluid including hydrogen sulfide ($H_2S$). The method includes injecting a drilling fluid into the subterranean geological formation through the wellbore. The drilling fluid composition includes 0.25 to 2 wt. % of a primary $H_2S$ scavenger which is potassium permanganate. The drilling fluid composition includes an invert emulsion which includes a continuous phase including mineral oil and a dispersive phase including water. The potassium permanganate present in the drilling fluid composition reacts with the $H_2S$ present in the formation fluid to produce a dispersion of manganese-containing particles which are at least one selected from the group consisting of manganese sulfide and manganese sulfate.

13 Claims, 2 Drawing Sheets

PERMANGANATE BASED HYDROGEN SULFIDE SCAVENGING DRILLING FLUID

CROSS-REFERENCE TO RELATED APPLICATIONS

The present application is a Divisional of U.S. application Ser. No. 17/751,785, now allowed, having a filing date of May 24, 2022.

BACKGROUND

Technical Field

The present disclosure is directed to a method of drilling a subterranean geological formation with a drilling fluid, and particularly, to the method of drilling the subterranean geological formation with a drilling fluid composition including a hydrogen sulfide ($H_2S$) scavenger.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Driving a drill bit to form a wellbore into a subterranean geological formation may lead to production of a fluid including toxic hydrogen sulfide ($H_2S$). The $H_2S$ can be poisonous to humans and animals. A drilling fluid, also referred to as the drilling mud, is used in well drilling applications. The drilling fluid lubricates and cools the drill bit, removes drilling cuttings and solid suspensions, seals a permeable formation, and prevents formation damage by controlling a subsurface pressure. The drilling fluid is one or more of water-based muds (WBMs) and oil-based muds (OBMs). The WBMs react or interfere with a shale formation. Therefore, the OBMs are preferred over the WBMs. However, current OBMs of invert emulsions are devoid of potent $H_2S$ scavengers.

Lehrer et al. (U.S. Pat. No. 9,587,181) disclosed the use of water-soluble aldehyde and transition metal salts for the $H_2S$ scavenging from aqueous fluids. Garrett et al. [Garrett, R. L.; Clark, R. K.; Carney, L. L.; Grantham, C. K., 1979, Chemical scavengers for sulfides in water-base drilling fluids, Journal of Petroleum Technology, 31(6): 787-796] used zinc compounds (e.g., zinc carbonate and zinc oxide) as the $H_2S$ scavengers. Paulsen et al. (U.S. Pat. No. 6,881,389) proposed a process for the removal of the $H_2S$ or carbon dioxide from natural gas via absorption and disassociation utilizing a seawater contact system. Muller et al. (U.S. Pat. No. 7,235,697) disclosed a process for producing thiols, thioethers and disulfides by reacting olefins with the $H_2S$ in the presence of water and carbon dioxide. Keller et al. (U.S. Pat. No. 6,946,111) disclosed a process for the $H_2S$ removal from a gas stream via a reaction of the $H_2S$ with $O_2$ over a suitable catalyst. McManus (U.S. Pat. No. 5,215,728) disclosed a method for the $H_2S$ scavenging using polyvalent metal redox absorption solution.

However, none of the references describe methods including OBMs of invert emulsions which may include efficient $H_2S$ scavengers. Accordingly, it is an object of the present disclosure to provide methods to overcome the aforementioned limitations.

SUMMARY

In an exemplary embodiment, a method of drilling a subterranean geological formation is described. The method includes driving a drill bit to form a wellbore into the subterranean geological formation thereby producing a formation fluid including hydrogen sulfide ($H_2S$) and injecting a drilling fluid into the subterranean geological formation through the wellbore. The drilling fluid composition includes 0.25 to 2 wt. % of a primary $H_2S$ scavenger, which is potassium permanganate, and an invert emulsion. The invert emulsion includes a continuous phase including mineral oil, and a dispersive phase including water. The potassium permanganate present in the drilling fluid composition reacts with the $H_2S$ present in the formation fluid to produce a dispersion of manganese-containing particles which are at least one selected from the group consisting of manganese sulfide and manganese sulfate.

In some embodiments, the drilling fluid composition is injected into the subterranean geological formation through the wellbore to maintain a pressure in the wellbore that is higher than a static pressure of the subterranean geological formation.

In some embodiments, the formation fluid is at least one selected from a sour gas and a sour crude oil.

In some embodiments, the potassium permanganate present in the drilling fluid reacts with 0.175 to 0.275 equivalents of the $H_2S$ by weight.

In some embodiments, the drilling fluid further includes 2 to 4 wt. % a primary emulsifier; 0.25 to 0.50 wt. % a secondary emulsifier; 4 to 6 wt. % a viscosifier; 0.4 to 0.7 wt. % at least one fluid loss prevention agent; 0.6 to 1.0 wt. % a pH adjusting agent including an alkali metal base; 0.25 to 2 wt. % a clay stabilizer including an alkali metal halide salt; 0.05 to 0.5 wt. % a filtration rate agent, and 1 to 3 wt. % a weighting agent.

In some embodiments, the drilling fluid has a maximum oil separation of less than 2% after 20 days.

In some embodiments, the invert emulsion includes 75 to 85 vol % mineral oil and 15 to 25 vol % water.

In some embodiments, the primary emulsifier is sorbitan oleate.

In some embodiments, the secondary emulsifier is a rhamnolipid.

In some embodiments, the viscosifier is bentonite.

In some embodiments, the fluid loss prevention agent is at least one selected from the group consisting of corn starch and poly(vinyl butyral)-co-vinyl alcohol-co-vinyl acetate (PVBA).

In some embodiments, the fluid loss prevention agent is a mixture of 85 to 90 wt. % the corn starch and 10 to 15 wt. % the PVBA, each based on a total weight of the mixture.

In some embodiments, the alkali metal base is sodium hydroxide.

In some embodiments, the alkali metal halide salt is potassium chloride.

In some embodiments, the filtration rate agent is sodium carbonate.

In some embodiments, the weighting agent is hydrophobic metallic zinc nanoparticles.

In another exemplary embodiment, a drilling fluid is described. The drilling fluid includes 0.25 to 2 wt. % of a primary $H_2S$ scavenger, which is potassium permanganate and an invert emulsion. The invert emulsion includes a continuous phase including mineral oil and a dispersive phase including water. The drilling fluid is configured to produce upon contact with $H_2S$, a dispersion of the manganese-containing particles which are at least one selected from the group consisting of manganese sulfide and manganese sulfate.

In some embodiments, the drilling fluid includes 2 to 4 wt. % a primary emulsifier, 0.25 to 0.50 wt. % a secondary emulsifier, 4 to 6 wt. % a viscosifier, 0.4 to 0.7 wt. % at least one fluid loss prevention agent, 0.6 to 1.0 wt. % a pH adjusting agent including an alkali metal base, 0.25 to 2 wt. % a clay stabilizer including an alkali metal halide salt, 0.05 to 0.5 wt. % a filtration rate agent, and 1 to 3 wt. % a weighting agent.

In some embodiments, the primary emulsifier is sorbitan oleate, the secondary emulsifier is a rhamnolipid, the viscosifier is bentonite, the fluid loss prevention agent is at least one selected from the group consisting of corn starch and PVBA, the alkali metal base is sodium hydroxide, the alkali metal halide salt is potassium chloride, the filtration rate agent is sodium carbonate, and the weighting agent is hydrophobic metallic zinc nanoparticles.

In some embodiments, the drilling fluid has a maximum oil separation of less than 2% after 20 days.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

According to a first aspect, the present disclosure relates to a method of drilling a subterranean geological formation.

The method involves driving a drill bit to form a wellbore into the subterranean geological formation thereby producing a formation fluid including hydrogen sulfide ($H_2S$) and injecting a drilling fluid (otherwise referred to as the drilling mud) into the subterranean geological formation through the wellbore. The drilling fluid composition includes 0.25 to 2 wt. % of a primary $H_2S$ scavenger, which is potassium permanganate, and an invert emulsion. The invert emulsion includes a continuous phase including a mineral oil, and a dispersive phase including water. The potassium permanganate present in the drilling fluid composition reacts with the $H_2S$ present in the formation fluid to produce a dispersion of manganese-containing particles which are at least one selected from the group consisting of manganese sulfide and manganese sulfate.

Figure 1:
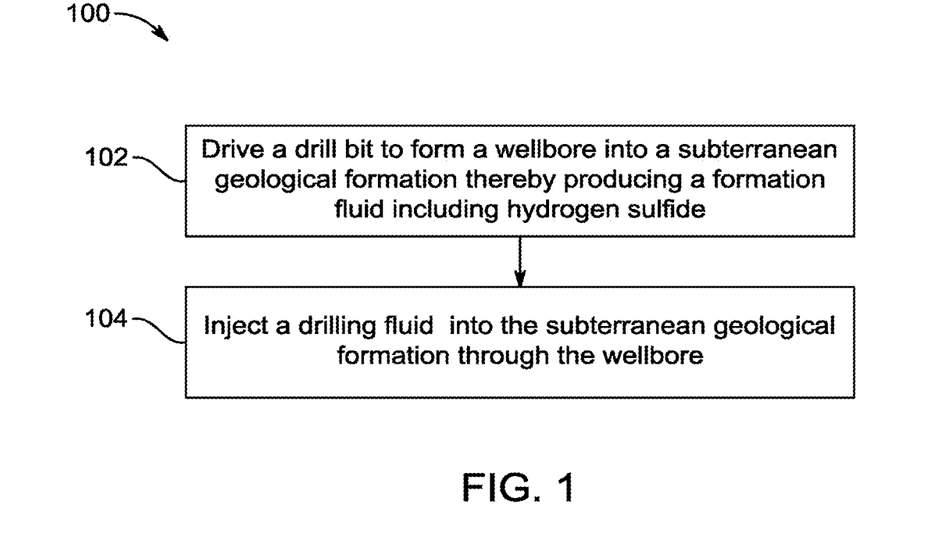
FIG. 1 is a schematic flow chart of a method of drilling a subterranean geological formation, according to certain embodiments.

FIG. 1 illustrates a schematic flow chart of a method 100 of drilling the subterranean geological formation. The order in which the method 100 is described is not intended to be construed as a limitation, and any number of the described method steps can be combined in any order to implement the method 100. Additionally, individual steps may be removed or skipped from the method 100 without departing from the spirit and scope of the present disclosure.

At step 102, the method 100 includes driving a drill bit into the subterranean geological formation. This may be accomplished using any suitable equipment or technique known to one of ordinary skill in the art. There are no specific limitations placed on, for example, the type of drill bit used, the equipment used in the driving, or other suitable equipment used such as positioning devices, monitoring devices, ground scanning devices, or the like. In some embodiments, a site of interest is first identified, and a drill truck drills a starter hole. Then, the wellbore is drilled with the drill bit coupled to a motor. The wellbore may be drilled to a depth of at least 1,000 m, preferably at least 2,000 m, preferably at least 5,000 m, preferably at least 7,000 m, but no more than 10,000 m. In some embodiments, a site of interest is first identified, and a drill truck drills a starter hole. The wellbore can be drilled with the drill bit coupled to a motor. The drill bit and the motor used in this disclosure are not meant to be limiting and various drill bits and motors may be utilized. In some embodiments, the drill bit may include, but is not limited to a twist drill, counterbore, countersink and flat bottom boring. The method 100 includes driving the drill bit to form a wellbore into the subterranean geological formation. The subterranean geological formation may include, but is not limited to, an oil reservoir, a gas reservoir, a mixed hydrocarbon bearing subterranean formation, a saline formation, or a coal bed. In the present disclosure, the wellbore may be a portion of an oil well or a gas well, i.e. a borehole, that faces a formation matrix of the subterranean geological formation. In some embodiments, the wellbore includes casing that is made up of one or more metal selected from one or more of stainless steel, aluminum, fiberglass and titanium. In some embodiments, the wellbore may be a horizontal wellbore or a multilateral wellbore. The horizontal wellbore may include one or more sections located parallel to a ground surface.

The driving of the drill bit to form the wellbore into the subterranean geological formation thereby produces a formation fluid. The composition of the formation fluid that may be produced during the drilling may depend on the type of the subterranean geological formation. In some embodiments, the formation fluid is at least one selected from a sour gas and a sour crude oil. The sour gas is a natural gas including an amount of the $H_2S$. In some embodiments, the formation fluid may include, but is not limited to, natural gas (i.e., primarily methane), hydrocarbon or non-hydrocarbon gases (including condensable and non-condensable gases), light hydrocarbon liquids, heavy hydrocarbon liquids, rock, oil shale, bitumen, oil sands, tar, coal, and/or water. Further, the non-condensable gases may include, but are not limited to hydrogen, carbon monoxide, carbon dioxide and methane. In some other embodiments, the formation fluid may be in the form of a gaseous fluid, a liquid, or a double-phase fluid. In some embodiments, the formation fluid includes the $H_2S$. Microorganisms such as sulfate reducing bacteria may generate the $H_2S$ in gas and oil reservoirs.

At step 104, the method 100 includes injecting the drilling fluid into the subterranean geological formation through the wellbore. In some embodiments, the drilling fluid composition is injected into the subterranean geological formation through the wellbore to maintain a temperature and a pressure in the wellbore that is higher than a static pressure of the subterranean geological formation. A formation fluid may be produced during or after the drilling. During the drilling, the drilling fluid composition is injected optionally into the subterranean geological formation through the well bore to lubricate and cool the drill bit and to remove drilling cuttings. In some embodiments, the drilling fluid composition is injected at a flow rate ranging from 12 to 26 L/s, preferably 15 to 22 L/s, more preferably 17 to 20 L/s.

In some embodiments, the method comprises cycling the drilling fluid composition described below with a different drilling fluid composition, such as one which does not contain a $H_2S$ scavenger. That is, for a portion of the drilling, the drilling fluid composition described below is used and for a different portion of the drilling, the other drilling fluid composition is used. Such portions may be performed in any suitable pattern and with any suitable period or frequency. For example, when a level of $H_2S$ in a formation fluid or other suitable fluid rises to a threshold level, the drilling fluid composition described below may be used. The drilling fluid composition described below may be used until the level of $H_2S$ drops below the threshold level. Such cycling may be advantageous for reasons such as safety of workers associated with the drilling operations, avoiding corrosion or other degradation of drilling hardware or other wellbore hardware, or economic factors such as cost. In some embodiments, the other drilling fluid composition has a composition similar to that of the drilling fluid composition described below but which does not comprise the potassium permanganate primary $H_2S$ scavenger. The cycling may comprise addition of the potassium permanganate, added in any suitable form, to the other drilling fluid composition to form the drilling fluid composition described below. That is, the cycling may involve the addition of "pulses" of potassium permanganate into a drilling fluid to form the drilling fluid composition described below.

In another embodiment a permanganate-containing composition is injected into a wellbore in the form of a gel or suspension. The permanganate, prior to injection into the well, is mixed as an aqueous solution at high turbulence and shear with an oil phase together in the presence of an excess amount of a viscoelastic surfactant. A preferable surfactant is CTAB modified as a gemini from or two-tailed surfactant molecule, preferably in an amount of 5-25%, 10-20% or about 15% by weight of the total weight of the composition. When mixed under high shear the permanganate-containing water solution, the oil and the surfactant form a gel or micelle-containing composition. This in turn is injected immediately after formation into the wellbore such that the micelle or gel characteristic of the composition is maintained until the permanganate-containing composition reaches a target location in the wellbore. Preferably the permanganate-containing composition is made continuously during the injection and is injected into the wellbore immediately and continuously while being formed.

The drilling fluid composition includes 0.25 to 2 wt. %, preferably 0.35 to 1.75, preferably 0.50 to 1.5 wt. %, preferably 0.55 to 1.45 wt. %, preferably 0.60 to 1.40 wt. %, preferably 0.65 to 1.35 wt. %, preferably 0.70 to 1.30 wt. %, preferably 0.75 to 1.25 wt. %, preferably 0.80 to 1.20 wt. %, preferably 0.85 to 1.15 wt. %, preferably 0.90 to 1.10 wt. %, preferably 0.95 to 1.05 wt. %, preferably 1 wt. % of the primary $H_2S$ scavenger, which is the potassium permanganate. In some embodiments, the potassium permanganate present in the drilling fluid reacts with 0.175 to 0.275 equivalents of the $H_2S$, preferably 0.20 to 0.250 equivalents of the $H_2S$ by weight. The potassium permanganate present in the drilling fluid composition reacts with the $H_2S$ present in the formation fluid to produce the dispersion of the manganese-containing particles which are at least one selected from the group consisting of the manganese sulfide and the manganese sulfate. In some embodiments, concentration of the potassium permanganate may be as high as a solubility limit in the drilling fluid at a given temperature and pressure.

The primary $H_2S$ scavenger (i.e. the potassium permanganate) can be present in or added to the drilling fluid composition in any suitable form. In some embodiments, the potassium permanganate is present in or added to the drilling fluid composition in an encapsulated form. Such an encapsulated form may be characterized by particles or granules of potassium permanganate which are surrounded by a coating of an encapsulating agent. Examples of encapsulating agents include, but are not limited to polymers such as polyvinyl acetate, polyethylene oxide, polycaprolactone, polylactic acid, polymethyl methacrylate, and the like; waxes such as paraffin wax, beeswax, soy wax, carnauba wax, and the like; and mixtures thereof. Removal or degradation (e.g. dissolving) of the encapsulating agent may occur on incorporation or addition to the drilling fluid composition, or on some trigger, such as the introduction of a specific encapsulating agent remover or degrader. This removal or degradation may result in the encapsulating agent being present in the drilling fluid composition. The encapsulating agent may be present in a state such that is no longer forms capsules. In some embodiments, the potassium permanganate is present in or added to the drilling fluid composition in a supported form. Such a supported from may be characterized by particles or granules of potassium permanganate present on the surface of or in pores of a suitable inorganic support. Examples of such inorganic supports include, but are not limited to porous silica and porous alumina. In some embodiments, the particles or granules of potassium permanganate are released from the inorganic support upon addition to or incorporation in the drilling fluid composition. In some embodiments, the particles or granules of potassium permanganate are released from the inorganic support upon addition of specific support release agent. In some embodiments, the particles or granules of potassium permanganate are released upon reaction with hydrogen sulfide. In some embodiments, the particles or granules of potassium permanganate react with hydrogen sulfide without being released from the support. Encapsulated or supported forms of potassium permanganate may be advantageous for storage or for use in the cycling of drilling fluid composition described above. Such forms may further be advantageous for increasing the safety of the drilling fluid composition or the preparation thereof, for example by limiting exposure of workers or other personnel to solid or liquid forms of potassium permanganate capable of harming said personnel.

In some embodiments, the drilling fluid further comprises a secondary $H_2S$ scavenger. In some embodiments, the secondary $H_2S$ scavenger may include copper compounds such as copper oxide, copper sulfate, copper molybdate, copper hydroxide, copper halide, copper carbonate, copper hydroxy carbonate, copper carboxylate, copper phosphate, copper hydrates and derivatives thereof, calcium salts, cobalt salts, nickel salts, lead salts, tin salts, zinc salts, iron salts, manganese salts, zinc oxide, iron oxides, manganese oxides, triazine, monoethanolamine, diethanolamine, caustic soda, and combinations thereof.

The drilling fluid includes an invert emulsion. Invert emulsions comprise a dispersive phase and a continuous phase. The dispersive phase is dispersed through the continuous phase as droplets, which are stabilized by primary and secondary emulsifiers of the drilling fluid. Hereinafter, the primary and secondary emulsifiers are collectively referred to as the 'emulsifiers' or 'surfactants' and individually referred to as the 'emulsifier' or 'surfactant', unless otherwise specified. In some embodiments, the continuous phase includes the primary emulsifier. In some embodiments, the dispersive phase includes the secondary emulsifier. In some embodiments, the dispersive phase also includes the $H_2S$ scavenger.

The invert emulsion includes a continuous phase comprising mineral oil and a dispersive phase comprising water. Mineral oil refers to a mixture of higher alkanes from a mineral source, particularly a distillate of petroleum. Other names for mineral oil include, but are not limited to white oil, paraffin oil, liquid paraffin (typically a highly refined medical grade), paraffinum liquidum, and liquid petroleum. Mineral oils may also be referred to by certain applications, such as transformer oil or vacuum pump oil. Typically, such oils further comprise additives or are specifically formulated to have certain properties such as viscosity, flash point, gel point, or to be non-foaming, provide oxidation protection, lubrication, or rust prevention. The mineral oil may be any suitable mineral oil known to one of ordinary skill in the art. Preferably, the mineral oil is a vacuum pump oil. The vacuum pump oil may be a new (i.e. unused in a vacuum pump) vacuum pump oil, or may be a used vacuum pump oil. The used vacuum pump oil may further comprise components related to or formed by the action of the vacuum pump on the oil as part of normal vacuum pump operation. Such components may be formed by, for example, oxidative processes, heating, or reaction with metal or non-metal components of the vacuum pump. Hereinafter, the mineral oil may be referred to as the vacuum pump oil. In general, the water may be any water containing solution, including saltwater, hard water, and/or fresh water. For purposes of this description, the term "saltwater" may include saltwater with a chloride ion content of between about 6000 ppm and saturation, and is intended to encompass seawater and other types of saltwater including groundwater containing additional impurities typically found therein. The term "hard water" may include water having mineral concentrations between about 2000 mg/L and about 300,000 mg/L. The term "fresh water" may include water sources that contain less than 6000 ppm, preferably less than 5000 ppm, preferably less than 4000 ppm, preferably less than 3000 ppm, preferably less than 2000 ppm, preferably less than 1000 ppm, preferably less than 500 ppm of salts, minerals, or any other dissolved solids. Salts that may be present in saltwater, hard water, and/or fresh water may be, but are not limited to, cations such as sodium, magnesium, calcium, potassium, ammonium, and iron, and anions such as chloride, bicarbonate, carbonate, sulfate, sulfite, phosphate, iodide, nitrate, acetate, citrate, fluoride, and nitrite. In some embodiments, the dispersive phase may include salt water. In some embodiments, the dispersive phase may include hard water. In some embodiments, the dispersive phase may include fresh water.

The drilling fluid composition also includes the invert emulsion including the continuous phase including the mineral oil and the dispersive phase including the water. In some embodiments, the invert emulsion includes 75 to 85 vol %, preferably 77.5 to 82.5 vol %, preferably 80 vol % mineral oil and 15 to 25 vol %, preferably 17.5 to 22.5 vol %, preferably 20 vol % water.

In general, the primary and/or secondary emulsifier may be a surfactant. In general, the surfactants may be a nonionic surfactant, an anionic surfactant, a cationic surfactant, a viscoelastic surfactant, or a zwitterionic surfactant. Anionic surfactants contain anionic functional groups at their head, such as sulfate, sulfonate, phosphate, and carboxylate. The anionic surfactant may be an alkyl sulfate, an alkyl ether sulfate, an alkyl ester sulfonate, an alpha olefin sulfonate, a linear alkyl benzene sulfonate, a branched alkyl benzene sulfonate, a linear dodecylbenzene sulfonate, a branched dodecylbenzene sulfonate, an alkyl benzene sulfonic acid, a dodecylbenzene sulfonic acid, a sulfosuccinate, a sulfated alcohol, a ethoxylated sulfated alcohol, an alcohol sulfonate, an ethoxylated and propoxylated alcohol sulfonate, an alcohol ether sulfate, an ethoxylated alcohol ether sulfate, a propoxylated alcohol sulfonate, a sulfated nonyl phenol, an ethoxylated and propoxylated sulfated nonyl phenol, a sulfated octyl phenol, an ethoxylated and propoxylated sulfated octyl phenol, a sulfated dodecyl phenol, and an ethoxylated and propoxylated sulfated dodecyl phenol. Other anionic surfactants include ammonium lauryl sulfate, sodium lauryl sulfate (sodium dodecyl sulfate, SLS, or SDS), and related alkyl-ether sulfates sodium laureth sulfate (sodium lauryl ether sulfate or SLES), sodium myreth sulfate, docusate (dioctyl sodium sulfosuccinate), perfluorooctanesulfonate (PFOS), perfluorobutanesulfonate, alkyl-aryl ether phosphates, and alkyl ether phosphates.

Cationic surfactants have cationic functional groups at their head, such as primary and secondary amines. Cationic surfactants include octenidine dihydrochloride; cetrimonium bromide (CTAB), cetylpyridinium chloride (CPC), benzalkonium chloride (BAC), benzethonium chloride (BZT), dimethyldioctadecylammonium chloride, and dioctadecyldimethylammonium bromide (DODAB).

Zwitterionic (amphoteric) surfactants have both cationic and anionic groups attached to the same molecule. Zwitterionic surfactants include CHAPS (3-[(3-cholamidopropyl) dimethylammonio]-1-propanesulfonate), cocamidopropyl hydroxysultaine, ocamidopropyl betaine, phospholipids, and sphingomyelins.

Nonionic surfactants have a polar group that does not have a charge. These include long chain alcohols that exhibit surfactant properties, such as cetyl alcohol, stearyl alcohol, cetostearyl alcohol, oleyl alcohol, and other fatty alcohols. Other long chain alcohols with surfactant properties include polyethylene glycols of various molecular weights, polyethylene glycol alkyl ethers having the formula $CH_3$—$(CH_2)_{10\text{-}16}$—$(O$—$C_2H_4)_{1\text{-}25}$—$OH$, such as octaethylene glycol monododecyl ether and pentaethylene glycol monododecyl ether; polypropylene glycol alkyl ethers having the formula: $CH_3$—$(CH_2)_{1\text{-}16}$—$(O$—$C_3H_6)_{1\text{-}25}$—$OH$; glucoside alkyl ethers having the formula $CH_3$—$(CH_2)_{1\text{-}16}$—$(O\text{-glucoside})_{1\text{-}3}$-$OH$, such as decyl glucoside, lauryl glucoside, octyl glucoside; polyethylene glycol octylphenyl ethers having the formula $C_8H_{17}$—$(C_6H_4)$—$(O$—$C_2H_4)_{1\text{-}25}$—$OH$, such as Triton X-100; polyethylene glycol alkylphenyl ethers having the formula $C_9H_{19}$—$(C_6H_4)$—$(O$—$C_2H_4)_{1\text{-}25}$—$OH$, such as nonoxynol-9; glycerol alkyl esters such as glyceryl laurate; polyoxyethylene glycol sorbitan alkyl esters such as polysorbate, sorbitan alkyl esters, cocamide MEA, cocamide DEA, dodecyldimethylamine oxide, block copolymers of polyethylene glycol and polypropylene glycol, such as poloxamers, and polyethoxylated tallow amine (POEA).

A dendritic surfactant molecule may include at least two lipophilic chains that have been joined at a hydrophilic center and have a branch-like appearance. In each dendritic surfactant, there may be from about 2 lipophilic moieties independently to about 4 lipophilic moieties attached to each hydrophilic group, or up to about 8 lipophilic moieties attached to the hydrophilic group for example. "Independently" as used herein with respect to ranges means that any lower threshold may be combined with any upper threshold. The dendritic surfactant may have better repulsion effect as a stabilizer at an interface and/or better interaction with a polar oil, as compared with other surfactants. Dendritic surfactant molecules are sometimes called "hyperbranched" molecules.

A dendritic extended surfactant is a dendritic surfactant having a non-ionic spacer arm between the hydrophilic group and a lipophilic tail. For example, the non-ionic spacer-arm extension may be the result of polypropoxylation, polyethoxylation, or a combination of the two with the polypropylene oxide next to the tail and polyethylene oxide next to the head. The spacer arm of a dendritic extended surfactant may contain from about 1 independently to about 20 propoxy moieties and/or from about 0 independently to about 20 ethoxy moieties. Alternatively, the spacer arm may contain from about 2 independently up to about 16 propoxy moieties and/or from about 2 independently up to about 8 ethoxy moieties. "Independently" as used herein with respect to ranges means that any lower threshold may be combined with any upper threshold. The spacer arm extensions may also be formed from other moieties including, but not necessarily limited to, glyceryl, butoxy, glucoside, isosorbide, xylitols, and the like. For example, the spacer arm of a dendritic extended surfactant may contain both propoxy and ethoxy moieties. The polypropoxy portion of the spacer arm may be considered lipophilic; however, the spacer arm may also contain a hydrophilic portion to attach the hydrophilic group. The hydrophilic group may generally be a polyethoxy portion having about two or more ethoxy groups. These portions are generally in blocks, rather than being randomly mixed. Further, the spacer arm extension may be a poly-propylene oxide chain.

Another type of surfactant is a viscoelastic surfactant (VES). Conventional surfactant molecules are characterized by having one long hydrocarbon chain per surfactant headgroup. In a viscoelastic gelled state these molecules aggregate into worm-like micelles. A viscoelastic gel is a gel that has elastic properties, meaning that the gel at least partially returns to its original form when an applied stress is removed. Typical viscoelastic surfactants include N-erucyl-N,N-bis(2-hydroxyethyl)-N-methyl ammonium chloride and potassium oleate, solutions of which form gels when mixed with inorganic salts such as potassium chloride and/or with organic salts such as sodium salicylate. Previously described surfactants may also be considered viscoelastic surfactants.

In some embodiments, the primary emulsifier is a polyaminated fatty acid which emulsifies water into oil in the OBMs. The primary emulsifier includes a lower hydrophilic-lyophilic balance (HLB) with respect to the secondary emulsifier. In some embodiments, the drilling fluid includes 2 to 4 wt. %, preferably 2.25 to 3.75 wt. %, preferably 2.5 to 3.5 wt. %, preferably 2.75 to 3.25 wt. %, preferably 2.9 to 3.1 wt. %, preferably 3.0 wt. % the primary emulsifier. In some embodiments, the primary emulsifier is sorbitan oleate (also referred to as span 80). In some embodiments, the continuous phase includes the sorbitan oleate (span 80).

In some embodiments, the drilling fluid includes 0.25 to 0.50 wt. %, preferably 0.30 to 0.45 wt. %, 0.325 to 0.425 wt. %, preferably 0.35 to 0.40 wt %, preferably 0.375 to 0.39 wt. %, preferably 0.38 wt. % a secondary emulsifier. In some embodiments, the secondary emulsifier is a rhamnolipid biosurfactant. In some embodiments, the dispersive phase includes the rhamnolipid.

In some embodiments, the drilling fluid has a maximum oil separation of less than 2%, preferably less than 1.9%, preferably less than 1.8%, preferably less than 1.7%, preferably less than 1.6%, preferably less than 1.5% after 20 days. The oil separation of less than 2% confirms efficient stability of the primary and secondary emulsifiers. In some embodiments, the HLB of the rhamnolipid-sorbitan oleate is 4.5, preferably 4.0.

In some embodiments, the drilling fluid comprises a viscosifier. In some embodiments, the dispersive phase includes the viscosifier. The viscosifier is an additive of the drilling fluid composition that increases viscosity of the drilling fluid. In some embodiments, the drilling fluid includes 4 to 6 wt. %, preferably 4.25 to 5.75 wt. %, preferably 4.5 to 5.5 wt. %, preferably 4.75 to 5.25 wt. %, preferably 5 wt. % the viscosifier. The term "viscosifier" as used in this disclosure refers to an additive of the drilling fluid composition that increases the viscosity of the drilling fluid. Exemplary viscosifiers include, but are not limited to sodium carbonate (soda ash), bauxite, dolomite, limestone, calcite, vaterite, aragonite, magnesite, taconite, gypsum, quartz, marble, hematite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earth, and halloysite. In some embodiments, the viscosifier may further include a natural polymer such as hydroxyethyl cellulose (HEC), carboxymethylcellulose, polyanionic cellulose (PAC), or a synthetic polymer such as poly(diallyl amine), diallyl ketone, diallyl amine, styryl sulfonate, vinyl lactam, laponite, polygorskites (such as attapulgite, sepiolite), and combinations thereof. In some embodiments, the viscosifier may further include one or more thickening agents such as XC-polymer, xanthan gum, guar gum, glycol, and combinations thereof. In some embodiments, the viscosifier is bentonite. The 'bentonite' may refer to potassium bentonite, sodium bentonite, calcium bentonite, aluminum bentonite, and combinations thereof, depending on the relative amounts of potassium, sodium, calcium, and aluminum in the bentonite. In some embodiments, the viscosifier is a corn starch.

In some embodiments, the drilling fluid comprises at least one fluid loss prevention agent. The term "fluid-loss control agent" as used herein refers to an additive of the drilling fluid composition that controls loss of the drilling fluid when injected into a subterranean geological formation. Exemplary fluid-loss control agents include, but are not limited to starch, polysaccharides, silica flour, gas bubbles (energized fluid or foam), benzoic acid, soaps, resin particulates, relative permeability modifiers, degradable gel particulates, hydrocarbons dispersed in fluid, and one or more immiscible fluids. In some embodiments, the dispersive phase includes the fluid loss prevention agent. In some embodiments, the drilling fluid may include multiple fluid loss prevention agents. In some embodiments, the drilling fluid includes 0.4 to 0.7 wt. %, preferably 0.45 to 0.6 wt. % of the fluid loss prevention agent. In some embodiments, the fluid loss prevention agent is at least one selected from the group consisting of the corn starch and poly(vinyl butyral)-co-vinyl alcohol-co-vinyl acetate (PVBA). In some embodiments, the fluid loss prevention agent is a mixture of 85 to 90 wt. % the corn starch and 10 to 15 wt. % the PVBA, each based on a total weight of the mixture.

In some embodiments, the drilling fluid comprises a pH adjusting agent, also referred to as the buffer. In some embodiments, the dispersive phase includes the pH adjusting agent. The pH adjusting agent is an additive of the drilling fluid composition that adjusts the pH of the drilling fluid composition. The pH adjusting agent includes an alkali metal base. In some embodiments, the drilling fluid includes 0.6 to 1.0 wt. %, preferably 0.65 to 0.95 wt. %, preferably 0.7 to 0.9 wt. % of the pH adjusting agent including the alkali metal base. The alkali metal base may be an alkali metal hydroxide, such as potassium hydroxide, lithium hydroxide, rubidium hydroxide and cesium hydroxide. In some embodiments, the alkali metal base is sodium hydroxide. In some embodiments, the pH adjusting agent may include, but is not limited to, monosodium phosphate, disodium phosphate, sodium tripolyphosphate. In some embodiments, the pH of the drilling fluid is acidic or neutral. In some embodiments, the pH of the drilling fluid is basic.

In some embodiments, the drilling fluid comprises a clay stabilizer comprising an alkali metal halide salt. In some embodiments, the dispersive phase includes the alkali metal halide salt. In some embodiments, 0.25 to 2 wt. %, preferably 0.35 to 1.75, preferably 0.50 to 1.5 wt. %, preferably 0.55 to 1.45 wt. %, preferably 0.60 to 1.40 wt. %, preferably 0.65 to 1.35 wt. %, preferably 0.70 to 1.30 wt. %, preferably 0.75 to 1.25 wt. %, preferably 0.80 to 1.20 wt. %, preferably 0.85 to 1.15 wt. %, preferably 0.90 to 1.10 wt. %, preferably 0.95 to 1.05 wt. %, preferably 1 wt. % a clay stabilizer includes the alkali metal halide salt. The clay stabilizer is an additive of the drilling fluid composition that aids in the stabilization of shales and to control swelling clays. In some embodiments, the alkali metal halide salt is potassium chloride. In some embodiments, the alkali metal halide salt may include, but is not limited to, sodium chloride, lithium chloride, rubidium chloride, and cesium chloride. In some embodiments, the clay stabilizer may include an alkaline earth metal halide salt. In some embodiments, the alkaline earth metal halide salt may include, but is not limited to, calcium chloride, and magnesium chloride.

In some embodiments, the drilling fluid comprises 0.05 to 0.5 wt. % a filtration rate agent. In some embodiments, the dispersive phase includes the filtration rate agent. The filtration rate agent is an additive for aqueous drilling fluids to reduce the loss of fluids from a mud cake to pores of the formation during drilling of oil and gas wells. In some embodiments, the filtration rate agent is sodium carbonate.

In some embodiments, the drilling fluid comprises a weighting agent. The weighting agent is an agent that increases an overall density of the drilling fluid in order to provide sufficient bottom-hole pressure to prevent an unwanted influx of formation fluids. Examples of weighting agents include, but are not limited to, calcium carbonate, barite, sodium sulfate, hematite, siderite, ilmenite, and hydrophobic zinc nanoparticles. In some embodiments, the weighting agent is hydrophobic metallic zinc nanoparticles. In some embodiments, the continuous phase includes the hydrophobic metallic zinc nanoparticles. In some embodiments, the drilling fluid includes 1 to 3 wt. %, preferably 1.25 to 2.75 wt. %, preferably 1.5 to 2.5 wt. %, preferably 1.75 to 2.25 wt. %, preferably 1.9 to 2.1 wt. %, preferably 2.0 wt. % of the weighting agent.

In some embodiments, the drilling fluid further comprises a deflocculant. Deflocculant is an additive of the drilling fluid composition that prevents a colloid from coming out of suspension or slurries. In some embodiments, the deflocculant may include, but is not limited to, an anionic polyelectrolyte, for example, acrylates, polyphosphates, lignosulfonates (LS), or tannic acid derivatives, for example, quebracho.

In some embodiments, the drilling fluid further comprises a lubricant. In some embodiments, LUBE 10170B may be used as the lubricant. In some embodiments, the lubricant may include, but is not limited to, polyalpha-olefin (PAO), synthetic esters, polyalkylene glycols (PAG), phosphate esters, alkylated naphthalenes (AN), silicate esters, ionic fluids, and multiply alkylated cyclopentanes (MAC).

In some embodiments, the drilling fluid further comprises a crosslinker. The crosslinker is an additive of the drilling fluid composition that can react with multiple-strand polymers to couple molecules together, thereby creating a highly viscous fluid, with a controllable viscosity. The crosslinker may include, but is not limited to, metallic salts, such as salts of Al, Fe, B, Ti, Cr, and Zr, or organic crosslinkers such as polyethylene amides and formaldehyde.

In some embodiments, the drilling fluid further comprises a breaker. The breaker is an additive of the drilling fluid composition that provides a desired viscosity reduction in a specified period of time. The breaker may include, but is not limited to, oxidizing agents, such as sodium chlorites, sodium bromate, hypochlorites, perborate, persulfates, peroxides, and enzymes.

In some embodiments, the drilling fluid further comprises a biocide. The biocide is an additive of the drilling fluid composition that may kill microorganisms present in the drilling fluid composition. The biocide may include, but is not limited to, phenoxyethanol, ethylhexyl glycerine, benzyl alcohol, methyl chloroisothiazolinone, methyl isothiazolinone, methyl paraben, ethyl paraben, propylene glycol, bronopol, benzoic acid, imidazolinidyl urea, 2,2-dibromo-3-nitrilopropionamide, and 2-bromo-2-nitro-1,3-propanedial.

In some embodiments, the drilling fluid further comprises a corrosion inhibiting agent. The corrosion inhibiting agent is a chemical compound that decreases the corrosion rate of a material, more preferably, a metal or an alloy, that comes into contact with the drilling fluid. In some embodiments, the corrosion inhibiting agent may include, but is not limited to, imidazolines, and amido amines. In some embodiments, the corrosion inhibiting agent may include, but is not limited to, oxides, sulfides, halides, nitrates, preferably halides, of metallic elements of group IIIa to Via such as $SbBr_3$.

In some embodiments, the drilling fluid further comprises an anti-scaling agent. The anti-scaling agent is an additive of the drilling fluid composition that inhibit the formation and precipitation of crystallized mineral salts that form scale. The anti-scaling agent may include, but is not limited to, phosphonates, acrylic co/ter-polymers, polyacrylic acid (PAA), phosphino poly carboxylic acid (PPCA), phosphate esters, hexamethylene diamine tetrakis (methylene phosphonic acid), diethylene triamine tetra (methylene phosphonic acid), diethylene triamine penta (methylene phosphonic acid) (DETA phosphonate), bis-hexamethylene triamine pentakis (methylene phosphonic acid) (BHMT phosphonate), 1-hydroxyethylidene 1,1-diphosphonate (HEDP phosphonate), and polymers of sulfonic acid on a polycarboxylic acid backbone. In some embodiments, the anti-scaling agent may further include phosphine, sodium hexametaphosphate, sodium tripolyphosphate and other inorganic polyphosphates, hydroxy ethylidene diphosphonic acid, butane-tricarboxylic acid, phosphonates, itaconic acid, and 3-allyloxy-2-hydroxy-propionic acid. In some embodiments, the drilling fluid may include metal sulfide scale removal agents such as hydrochloric acid.

In some embodiments, the drilling fluid further comprises a chelating agent. The chelating agent may include, but is not limited to, dimercaprol (2,3-dimercapto-1-propanol), diethylenetriaminepentaacetic acid (DTPA), hydroxyethylenediaminetriacetic acid (HEDTA), and ethylenediaminetetraacetic acid (EDTA).

Concentration of components of the drilling fluid may be varied to impart desired characteristics of the drilling fluid. For instance, the concentration of the potassium permanganate may be adjusted according to $H_2S$ amount that may be encountered during the wellbore drilling. The drilling fluid is configured to produce upon contact with the $H_2S$, a dispersion of manganese-containing particles which are at least one selected from the group consisting of manganese sulfide and manganese sulfate.

In some embodiments, the drilling fluid further includes 2 to 4 wt. % the primary emulsifier, 0.25 to 0.50 wt. % the secondary emulsifier, 4 to 6 wt. % the viscosifier, 0.4 to 0.7 wt. % the at least fluid loss prevention agent, 0.6 to 1.0 wt. % the pH adjusting agent including the alkali metal base, 0.25 to 2 wt. % the clay stabilizer including the alkali metal halide salt, 0.05 to 0.5 wt. % the filtration rate agent, and 1 to 3 wt. % the weighting agent.

In a preferred embodiment, embodiments, the primary emulsifier is the sorbitan oleate, the secondary emulsifier is the rhamnolipid, the viscosifier is the bentonite, the fluid loss prevention agent is at least one selected from the group consisting of the corn starch and the PVBA. In some embodiments, the fluid loss prevention agent is a mixture of 85 to 90 wt. % the corn starch and 10 to 15 wt. % the PVBA, each based on a total weight of the mixture.

In some embodiments, the alkali metal base is the sodium hydroxide, the alkali metal halide salt is the potassium chloride, the filtration rate agent is the sodium carbonate, and the weighting agent is the hydrophobic metallic zinc nanoparticles.

In some embodiments, the drilling fluid has the maximum oil separation of less than 2% after 20 days. In some embodiments, the drilling fluid performs sweetening of the sour gas. The sour gas may be bubbled into the drilling fluid to get devoid of $H_2S$. The present disclosure also relates to the $H_2S$ scavenging during a well stimulation.

The examples below are intended to further illustrate protocols for preparing, characterizing, and using the drilling fluid and for performing the method described above and are not intended to limit the scope of the claims.

Where a numerical limit or range is stated herein, the endpoints are included. Also, all values and subranges within a numerical limit or range are specifically included as if explicitly written out.

Obviously, numerous modifications and variations of the present invention are possible in light of the above teachings. It is therefore to be understood that, within the scope of the appended claims, the invention may be practiced otherwise than as specifically described herein.

EXAMPLES

Example 1

In some embodiments, when the drilling fluid includes neutral and acidic media (i.e., pH <7.5), the potassium permanganate converts the $H_2S$ into elemental sulfur by oxidation according to equation (1).

$$2KMnO_4 + 3H_2S \rightarrow 3S + 2KOH + 2MnO_2 + 2H_2O \quad (1)$$

The formed $MnO_2$ in equation (1) may also scavenge the $H_2S$ according to equation (2).

$$MnO_2 + 2H_2S \rightarrow MnS + S + 2H_2O \quad (2)$$

In some embodiments, when the drilling fluid includes alkaline media (i.e., pH >7.5), potassium permanganate converts the $H_2S$ into potassium sulfate according to equation (3).

$$4KMnO_4 + 2H_2S \rightarrow 2K_2SO_4 + 2MnO + 2MnO_2 + 2H_2O \quad (3)$$

The formed MnO and $MnO_2$ in equations (1), (3) may also scavenge the $H_2S$. The reaction of MnO with the $H_2S$ can be represented by equation (4).

$$MnO + H_2S \rightarrow MnS + H_2O \quad (4)$$

Hence, the present invention also relates to the $H_2S$ scavenging during a metal sulfide scale removal. Capturing and converting the $H_2S$ into an elemental sulfur or sulfates during the metal sulfide scale removal prevents the release of $H_2S$ into the well surface. In some embodiments, the manganese sulfide produced in-situ acts as the viscosifier or the weighting agent.

Example 2

The drilling fluid includes 80 vol % (out of the total liquid volume) vacuum pump oil, 20 vol % water, 5 wt. % bentonite, 2 wt. % hydrophobic zinc nanoparticles, 1 wt. % potassium chloride, 3 wt. % Span 80, 0.38 wt. % rhamnolipid biosurfactant, 1 wt. % potassium permanganate, 4.518 g/L (of the total liquid volume) corn starch, 0.602 g/L poly(vinyl butyral-co-vinyl alcohol-co-vinyl acetate), 0.714 g/L sodium hydroxide, and 2.50 g/L $Na_2CO_3$.

Example 3

Figure 2:
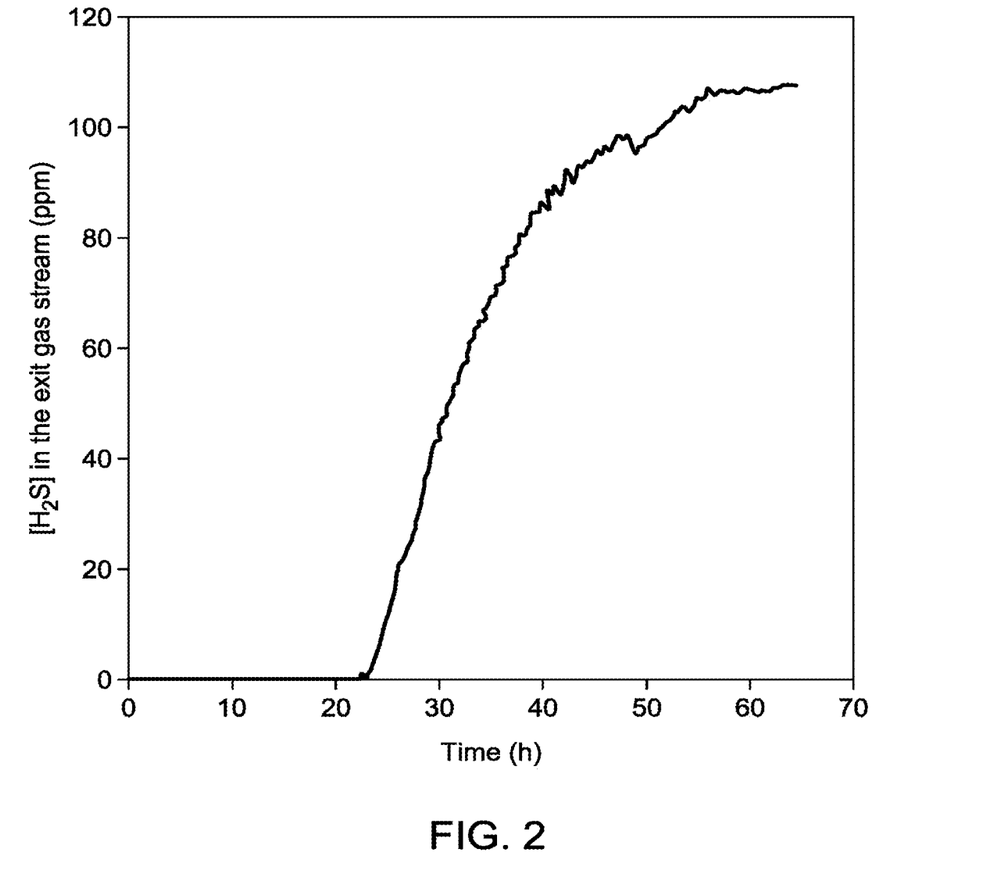
FIG. 2 is a graph depicting a breakthrough curve of hydrogen sulfide, according to certain embodiments.

$H_2S$ scavenging tests were performed using a glass column. The glass column had a fritted porous circular disk at the bottom. In the beginning of the $H_2S$ scavenging test, 10 grams (g) of the drilling fluid including 100 milligrams (mg) of the potassium permanganate was placed in the glass column. Then, a valve (below the fritted porous circular disk) at the bottom of the glass column was opened to allow the sour gas (107.5 parts per million (ppm) $H_2S$, balance methane) to flow into the glass column in the form of gas bubbles. The sour gas flow rate was kept constant at 100 milliliters per minute (mL/min). The sour gas exiting a bubble column (representing a gas/oil well) is sent to an $H_2S$ gas detector with a detection limit of 0.5 ppm. An exit gas stream was monitored and the concentration of the $H_2S$ in released gas from the well was continuously recorded until saturation is attained (i.e., when the $H_2S$ in the exit gas stream was equivalent to the $H_2S$ concentration in an inlet gas stream). Breakthrough time (i.e., when the $H_2S$ was first detected in an outlet gas stream) was about 23 hours (FIG. 2).

Example 4

The stability of the drilling fluid was monitored for 20 days. The maximum oil separation was about 1.3%. No water or solid separation was found.

The present disclosure provides the drilling fluid which are suitable for drilling high pressure-high temperature (HPHT) reservoirs. The drilling fluid includes high lubricity, which minimizes friction between a drill pipe and a wall of the wellbore. Hence, reducing the chances of the drill pipe getting stuck with the wellbore. Moreover, the drilling fluid are also suitable for drilling low pore formation pressures. The drilling fluid does not interfere with formation salts. Furthermore, the drilling fluid has properties such as decreased fluid loss, higher penetration rates, and a thinner filter cake. The drilling fluid prevents escape of the $H_2S$ to the well surface. The secondary emulsifier of the drilling fluid is environment-friendly and biodegradable surfactant. Furthermore, the emulsifiers of the drilling fluid provide stability to the drilling fluid. The drilling fluid also includes efficient rheological characteristics. Scavenging of the $H_2S$, while the pH of the drilling fluid is neutral and acidic, leads to the production of the elemental sulfur. The elemental sulfur produced in-situ may act as the viscosifier. The drilling fluid may effectively scavenge the $H_2S$ at a wide range of temperature. Thermal decomposition of the potassium permanganate starts slowly at 374 degrees Fahrenheit (° F.). The potassium permanganate is an effective $H_2S$ scavenger regardless of the pH of the drilling fluid.

The invention claimed is:

1. A drilling fluid, comprising:
0.25 to 2 wt. % of a primary hydrogen sulfide scavenger which is potassium permanganate;
an invert emulsion, comprising:
a continuous phase comprising mineral oil, and
a dispersive phase comprising water;
2 to 4 wt. % a primary emulsifier;
0.25 to 0.50 wt. % a secondary emulsifier;
4 to 6 wt. % a viscosifier;
0.4 to 0.7 wt. % at least one fluid loss prevention agent;
0.6 to 1.0 wt. % a pH adjusting agent comprising an alkali metal base;
0.25 to 2 wt. % a clay stabilizer comprising an alkali metal halide salt;
0.05 to 0.5 wt. % a filtration rate agent; and
1 to 3 wt. % a weighting agent;
wherein the drilling fluid is configured to produce upon contact with hydrogen sulfide, a dispersion of manganese-containing particles which are at least one selected from the group consisting of manganese sulfide and manganese sulfate.

2. The drilling fluid of claim 1, wherein the invert emulsion comprises 75 to 85 volume percent (vol %) mineral oil and 15 to 25 vol % water.

3. The drilling fluid of claim 1, wherein the primary emulsifier is sorbitan oleate.

4. The drilling fluid of claim 1, wherein the secondary emulsifier is a rhamnolipid.

5. The drilling fluid of claim 1, wherein the viscosifier is bentonite.

6. The drilling fluid of claim 1, wherein the fluid loss prevention agent is at least one selected from the group consisting of corn starch and poly(vinyl butyral)-co-vinyl alcohol-co-vinyl acetate (PVBA).

7. The drilling fluid of claim 6, wherein the fluid loss prevention agent is a mixture of 85 to 90 wt. % the corn starch and 10 to 15 wt. % the PVBA, each based on a total weight of the mixture.

8. The drilling fluid of claim 1, wherein the alkali metal base is sodium hydroxide.

9. The drilling fluid of claim 1, wherein the alkali metal halide salt is potassium chloride.

10. The drilling fluid of claim 1, wherein the filtration rate agent is sodium carbonate.

11. The drilling fluid of claim 1, wherein the weighting agent is hydrophobic metallic zinc nanoparticles.

12. The drilling fluid of claim 1, wherein:
the primary emulsifier is sorbitan oleate;
the secondary emulsifier is a rhamnolipid;
the viscosifier is bentonite;
the fluid loss prevention agent is at least one selected from the group consisting of the corn starch and the PVBA;
the alkali metal base is sodium hydroxide;
the alkali metal halide salt is potassium chloride;
the filtration rate agent is sodium carbonate; and
the weighting agent is hydrophobic metallic zinc nanoparticles.

13. The drilling fluid of claim 1, having a maximum oil separation of less than 2% after 20 days.

* * * * *